United States Patent [19]
Cooksey et al.

[11] Patent Number: 5,878,559
[45] Date of Patent: Mar. 9, 1999

[54] CORN HEAD SNAPPING AND GATHERING ROW UNIT

[75] Inventors: William L. Cooksey, Geneseo; Vincent M. Moster, Moline, both of Ill.

[73] Assignee: Case Corporation, Racine, Wis.

[21] Appl. No.: 767,818

[22] Filed: Dec. 17, 1996

[51] Int. Cl.[6] .......................... A01D 45/02; A01D 47/00
[52] U.S. Cl. ................................ 56/62; 56/64; 56/104; 56/16.4 R
[58] Field of Search ..................... 56/64, 62, 76, 56/103, 104, 107, 109, 16.4 R, 327.1, 328.1

[56] References Cited

U.S. PATENT DOCUMENTS

| | | |
|---|---|---|
| Re. 31,063 | 10/1982 | Greiner et al. . |
| Re. 31,064 | 10/1982 | Shriver . |
| 1,586,069 | 5/1926 | Clark et al. . |
| 2,379,822 | 7/1945 | Mitchell et al. . |
| 2,491,195 | 12/1949 | Messenger et al. . |
| 2,527,786 | 10/1950 | Barkstrom . |
| 2,826,031 | 3/1958 | Hansen . |
| 2,961,820 | 11/1960 | Hadley . |
| 3,352,093 | 11/1967 | Procter . |
| 3,429,111 | 2/1969 | Looker ........................... 56/103 |
| 3,496,708 | 2/1970 | Bornzin . |
| 3,499,272 | 3/1970 | Looker ........................... 56/109 |
| 3,528,233 | 9/1970 | Martner et al. . |
| 3,528,234 | 9/1970 | Kowalik et al. . |
| 3,670,482 | 6/1972 | Blanshine et al. . |
| 3,759,021 | 9/1973 | Schreiner et al. . |
| 3,808,783 | 5/1974 | Sutherland et al. . |
| 3,818,685 | 6/1974 | Stoessel et al. . |
| 3,854,272 | 12/1974 | Lane, III et al. . |
| 3,894,382 | 7/1975 | Jauss . |
| 3,940,913 | 3/1976 | Wallenfang et al. . |
| 3,982,384 | 9/1976 | Rohweder et al. . |
| 4,009,557 | 3/1977 | Reicks . |
| 4,106,270 | 8/1978 | Weigand et al. . |
| 4,227,368 | 10/1980 | Mossman et al. . |
| 4,269,017 | 5/1981 | deBuhr et al. . |

(List continued on next page.)

OTHER PUBLICATIONS

*Farm Show*, vol. 20, No. 5, 1996—"Build–It–Yourself" Narrow Row Header Kit.

1000 Series Corn Head, Operators Manual, 1995 Case Corporation.

1000 Series Corn Head, Parts Catalog, 1993 Case Corporation.

*Farm Industry News*, vol. 29, No. 11, 1996—"Does Narrow Row Corn Add Up?".

*Ontario Farmer*, vol. 29, No. 40, 1996—"Thinking 15–Inch".

Allis–Chalmers Tractor Division–Milwaukee, U.S.A., "1918–1960, An Informal History", Copyright 1989 by Alan C. King.

Operators Manual, Setting Up Instructions, "McCormick 34HM–21 Corn Snapper (Two Row, Mounted Type)", International Harvester Company (Date Unknown).

(List continued on next page.)

Primary Examiner—Terry Lee Melius
Attorney, Agent, or Firm—Foley & Lardner

[57] ABSTRACT

A combine and corn harvesting head of the type for removing ears of corn from their associated stalks are disclosed herein. The harvesting head includes a row unit for each row to be harvested by the combine while following a path through a field of corn to be harvested. The row units each include a stationary vertical surface and a continuous belt rotatably supported to provide a moving surface parallel to the vertical surface. The row unit removes ears of corn from their respective stalks when the ears are engaged by both the moveable and the stationary surfaces. More specifically, the movement of the moveable surface relative to the stationary surface rotates the ears relative to the stalks (i.e. rolls the ears along the stationary surface) to remove the ears and to convey them to the conveying auger of the harvesting head. The ears are then conveyed into the combine where they are threshed to remove the kernels of corn from the cobs of the ears.

20 Claims, 4 Drawing Sheets

U.S. PATENT DOCUMENTS

| | | |
|---|---|---|
| 4,327,542 | 5/1982 | Van Ginhoven . |
| 4,333,304 | 6/1982 | Greiner et al. . |
| 4,493,181 | 1/1985 | Glendenning et al. . |
| 4,531,351 | 7/1985 | Sousek . |
| 4,598,535 | 7/1986 | Sousek . |
| 4,771,592 | 9/1988 | Krone et al. . |
| 4,805,388 | 2/1989 | Kell . |
| 5,060,464 | 10/1991 | Caron . |
| 5,428,946 | 7/1995 | Hansen et al. .......................... 56/98 X |
| 5,528,887 | 6/1996 | Nagy et al. . |

OTHER PUBLICATIONS

Instruction Manual and Parts List, "Snapping Unit Frame Field Improvement Parts for McCormick–Deering, No. 14P, No. 24, Corn Pickers", International Harvester Company (Date Unknown).

CP–8 McCormick Parts Catalog, "34HM–20 Corn Picker, 34HM–21 Corn Snapper, 34HM–22 Sweet Corn Picker (Two–Row, Mounted–Type)", International Harvester Company (Date Unknown).

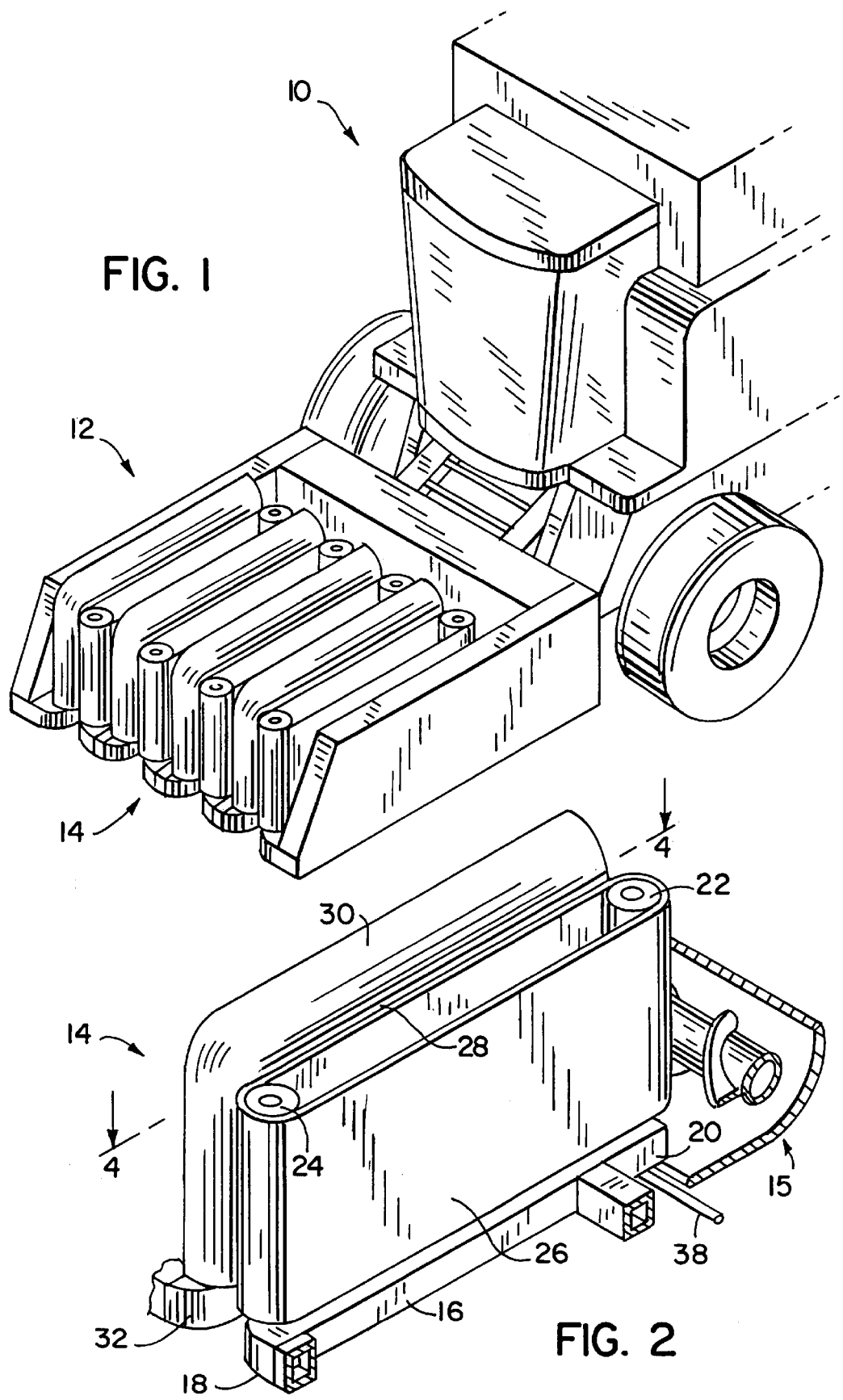

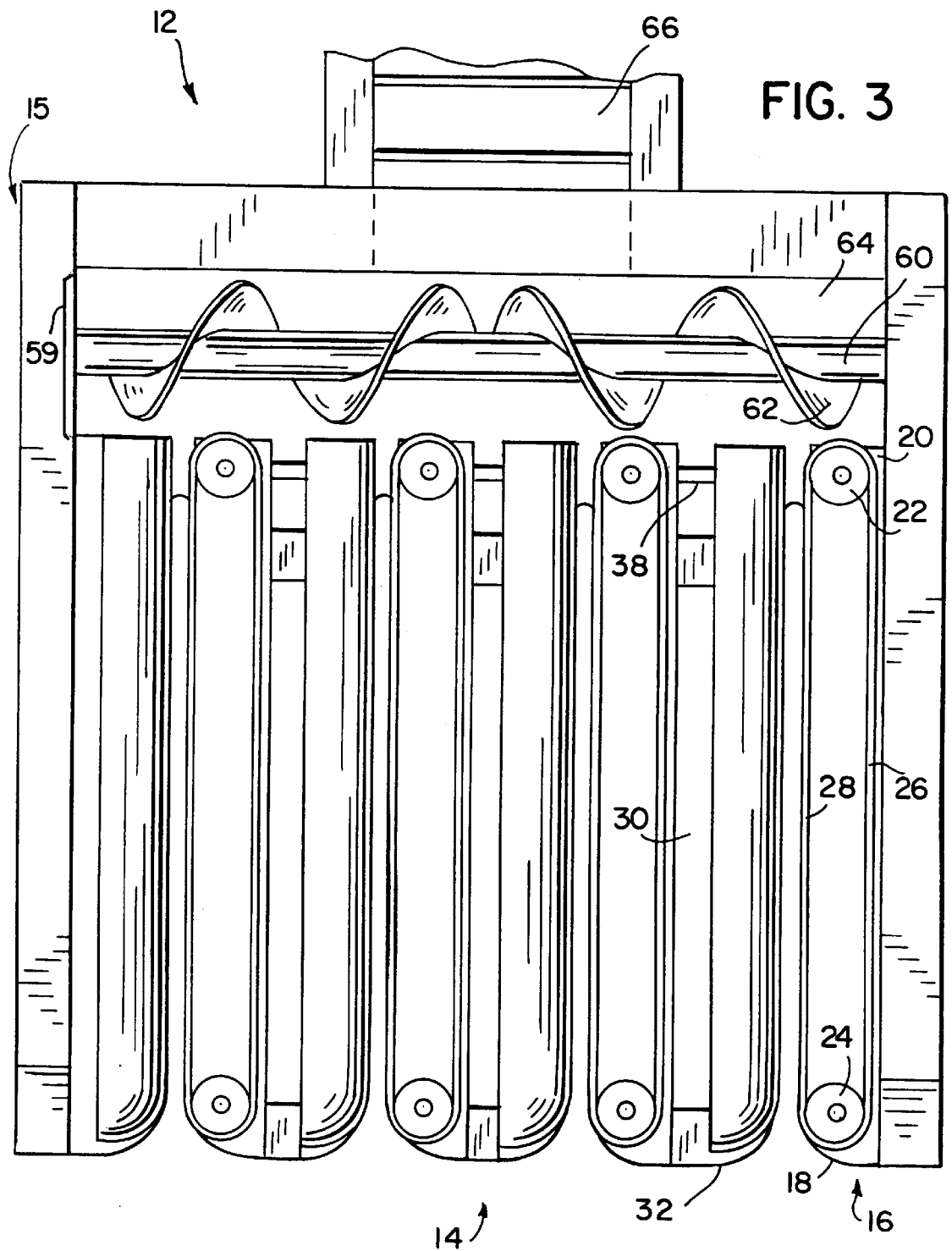

FIG. 4
FIG. 5
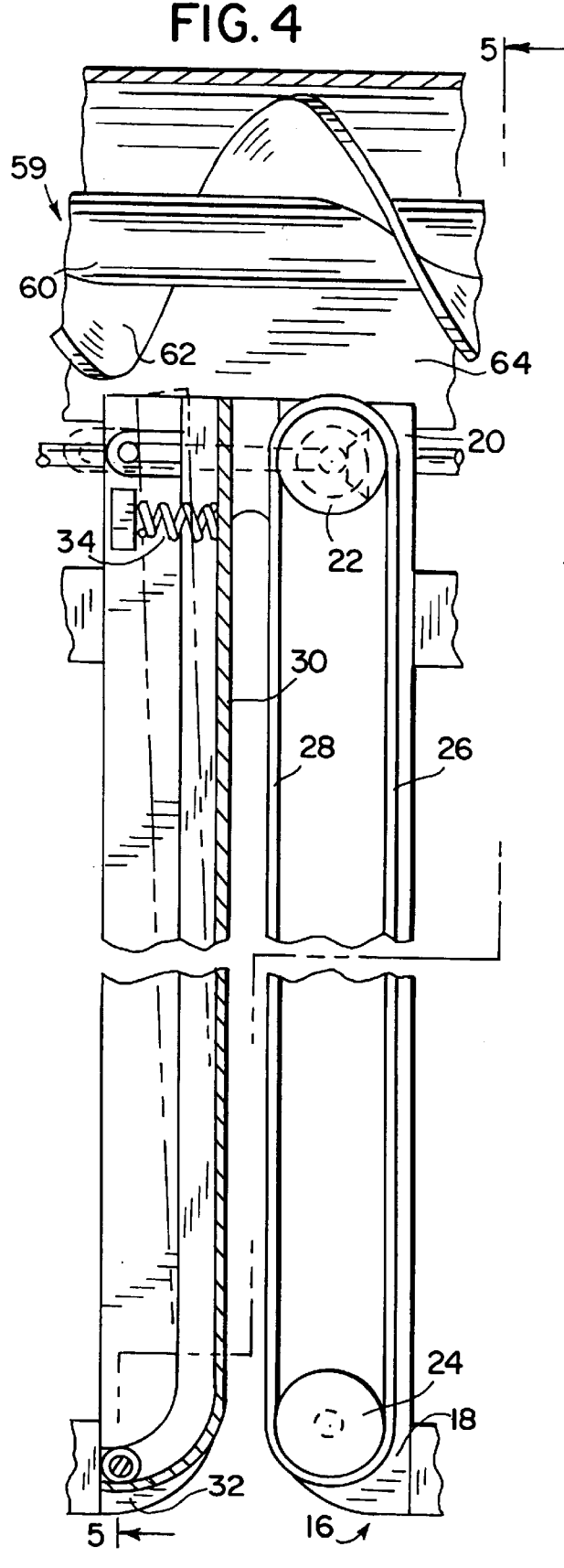
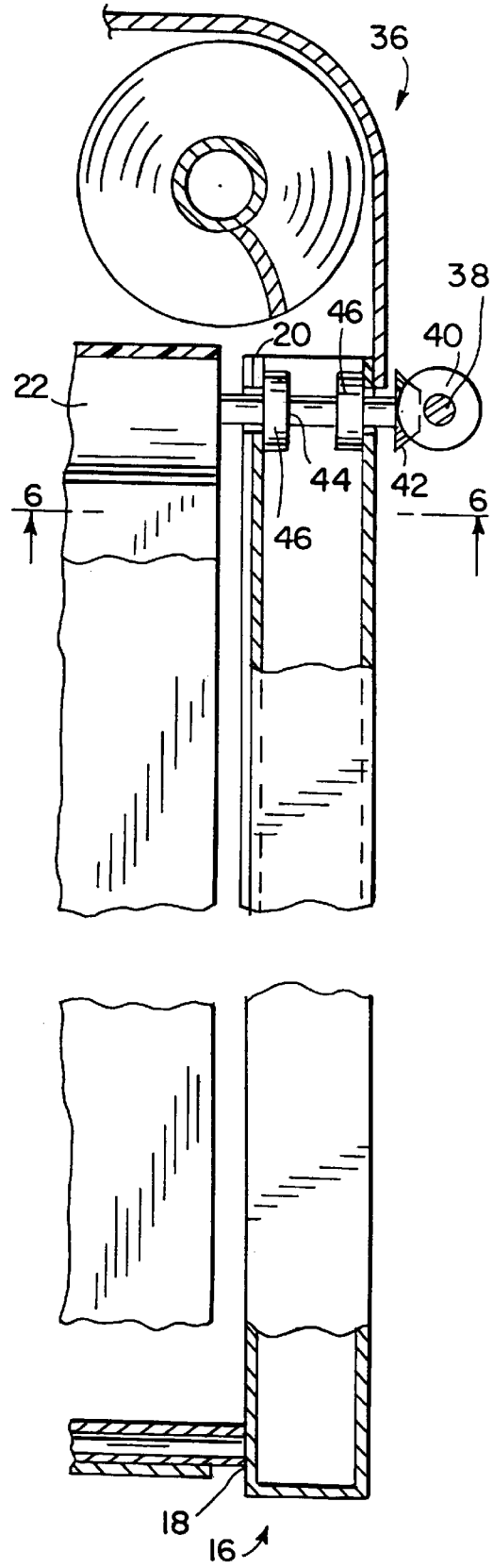

CORN HEAD SNAPPING AND GATHERING ROW UNIT

FIELD OF THE INVENTION

The present invention relates to harvesting ears of corn from their associated stalks. In particular, the present invention relates to an apparatus for twisting the ears of corn from their respective stalks.

BACKGROUND OF THE INVENTION

Typical combines are designed to harvest a variety of grain generating plants, such as, corn, wheat, oats, etc. Depending upon the type of plant to be harvested, the combine will be fitted with a harvesting head or header configured to harvest the desired plant. For example, the Case 2100 series combine can be used with a header for harvesting wheat, barley, milo, and flax, with a header for harvesting soy beans, and with a header for harvesting corn. However, as with most high quality and high durability agricultural implements as those of Case Corporation, such headers are relatively heavy and may require that the associated combine have four or six front tires to provide proper ground bearing pressures.

Turning to the corn harvesting head, attempts have been made to simplify and to reduce the weight of the components thereof. However, many such attempts have failed because the resulting header is not as effective in harvesting corn as the corn headers of the type sold by Case Corporation. Conventional headers which have been found to be relatively effective for harvesting corn typically include row units, each including two gathering chains, two snapping rolls, and a pair of associated stripper plates. In operation, the snapping rolls rotate to pull the corn stalks downwardly past the stripper plates. As the stalks are pulled downwardly, the ears of corn attached to the stalks are stripped from the stalks by the plates. The stripped ears are then conveyed into an auger of the header by the gathering chains.

In view of the current design of corn headers, it would be desirable to simplify and to reduce the weight of such headers. Furthermore, it would be desirable to reduce the energy required to remove such ears.

SUMMARY OF THE INVENTION

The present invention provides a harvesting device for removing a plant portion supported by a respective plant stalk. The device includes a frame, a stationary surface, and a continuous belt. The frame supports the stationary surface and the continuous belt. More specifically, two rollers movably support the belt relative to the frame. The continuous belt includes an outside surface to engage the plant portions such that the plant portion is compressed between the stationary and outside surfaces. Movement of the belt rotates the plant portion relative to the stalk to remove the plant portion from the stalk.

The present invention further provides a combine for removing ears of corn supported by corn stalks growing in an area of soil from the respective corn stalks. The combine includes a vehicle which typically includes a threshing mechanism for removing kernels of corn from the cobs of the ears. The vehicle is supported by and moveable over the soil. A header is attached to the vehicle. The header is configured to engage corn stalks which support ears of corn and to remove the ears therefrom. In particular, the header includes a moveable surface configured to engage the ears, to rotate the ears relative to their respective stalks, and to twist the ears from the respective stalks.

The present invention still further provides a combine for removing ears of corn supported by corn stalks growing in an area of soil from the respective corn stalks. This combine includes a vehicle which typically includes a threshing mechanism for removing kernels of corn from the cobs of the ears. The combine also includes engaging means, attached to the vehicle, for engaging and for rotating the ears relative to their respective stalks to remove the ears from the stalks.

BRIEF DESCRIPTION OF THE DRAWINGS

The present invention will become more fully understood from the following detailed description, taken in conjunction with the accompanying drawings, wherein like reference numerals refer to like parts, in which:

FIG. 1 is a perspective view of a combine, including a corn harvesting head with four row units for removing ears of corn from their respective stalks;

FIG. 2 is a perspective view of a single row unit of FIG. 1;

FIG. 3 is a top view of the corn harvesting head of FIG. 1, including the row units of FIG. 2 and an auger;

FIG. 4 is a cross-sectional view of a single row unit taken generally along line 4—4 in FIG. 2.

FIG. 5 is a cross-sectional view of the single row unit taken generally along line 5—5 in FIG. 4.

DETAILED DESCRIPTION

Figure 6:
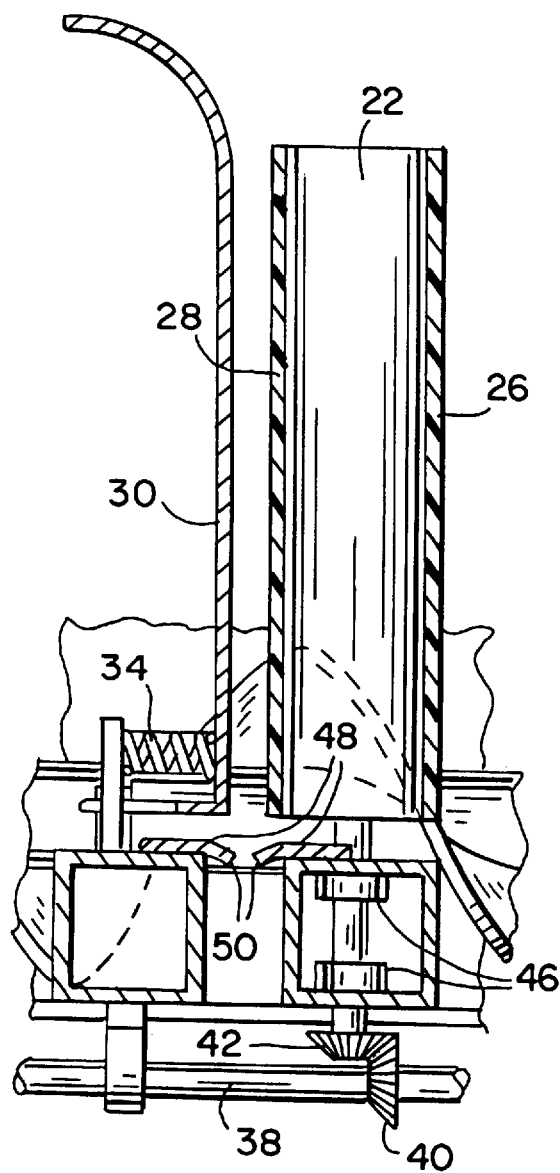
FIG. 6 is a cross-section view of the row unit taken generally along line 6—6 in FIG. 5.

Referring to FIG. 1, a harvesting machine or combine 10 with an attached corn harvesting head 12 for removing ears of corn from their respective stalks is shown. Harvesting head 12 includes a plurality of row units 14 and a conveyer 15. The plurality of the row units 14 corresponds to the plurality of rows of corn to be harvested by combine 10 as it traverses a path through a cornfield.

As shown in FIGS. 2 and 3, individual row units 14 include a drive roller 22 and a free-spinning roller 24, which are both supported by a roller frame 16 that is attached to combine 10. Free-spinning roller 24 is further supported by bearings (not shown) that are mounted to roller frame 16. Row unit 14 also includes a continuous belt 26 (e.g., a rubber-reinforced belt) that is movably supported by drive roller 22 and by free-spinning roller 24. Adjacent to continuous belt 26 is surface 30, which is resiliently supported by a stationary surface frame 32. Each row unit 14 has a front terminus 18 and a rear terminus 20. Rear terminus 20 attaches to combine 10, whereas front terminus 18 serves as a longitudinal extension of row unit 14 and as a corn engagement device. Therefore, row unit 14 extends forward from rear terminus 20 to front terminus 18. Roller frame 16 supports free-spinning roller 24 at front terminus 18 and drive roller 22 at rear terminus 20.

As indicated in FIGS. 4 and 6, row unit 14 is preferably configured such that stationary surface 30 is biased towards an outside surface 28 of continuous belt 26 by a compression spring 34. Stationary surface 30 preferably extends the length of stationary surface frame 32, is generally flat, and stands generally upright within a first plane. Similarly, outside surface 28 of continuous belt 26 is generally flat and stands generally upright within a second plane. The first plane, containing stationary surface 30, is substantially parallel to the second plane, containing outside surface 28 of continuous belt 26. Furthermore, first and second planes are generally perpendicular to a surface of an area of soil to be harvested.

Each row unit 14 is driven by a gear drive 36, as illustrated in FIG. 5. Gear drive 36 includes a gear shaft 38, a first bevel gear 40, a second bevel gear 42, a roller shaft 44, and a pair of roller shaft bearings 46. A plurality of bearings (not shown) rotatably support gear shaft 38, which extends the width of corn harvesting head 12. Roller shaft bearings 46 rotatably support roller shaft 44 which, in turn, rotatably supports second bevel gear 42 and drive roller 22. Furthermore, roller shaft 44 extends the height of drive roller 22 and forms its central axis of rotation.

As illustrated in FIGS. 5 and 6, roller shaft bearings 46 are preferably located on the walls of the hollow member roller frame 16. More specifically, one roller shaft bearings 46 may be a flange bearings bolted to the walls of the respective members of frame 16.

Gear drive 36 of row unit 14 is driven by a power source, e.g., a hydrostatic motor chain drive coupled to auger shaft 60 (not shown). When power is applied to gear drive 36, gear shaft 38 rotates in a predetermined direction which, in turn, drives the first bevel gear 40 to rotate in a preferred direction.

Thus, drive roller 22 rotates in the same preferred direction. Drive roller 22 then moves continuous belt 26. More specifically, the rotation of continuous belt 26 in a preferred direction drives outside surface 28 and free-spinning roller 24 to rotate in the same preferred direction: toward conveyer 15 of corn harvesting head 12.

Overall, corn harvesting head 12 operates as follows. As combine 10 traverses the cornfield, row units 14 engage respective rows of corn stalks having attached corn ears. Corn stalks of each row are received between stationary surface 30 and outside surface 28 of continuous belt 26 of respective row units 14. While the outside surface 28 of continuous belt 26 in each individual row unit 14 is rotating toward conveyer 15, compression spring 34 (FIGS. 4 and 6) applies a predetermined amount of force (e.g., 5–50 pounds) on stationary surface 30, thereby compressing corn ears between stationary surface 30 and outside surface 28 of continuous belt 26. The simultaneous rotation of outside surface 28 of continuous belt 26 causes the corn ears to be twisted from their respective stalks, thereby severing the connection between corn ears and respective stalks.

Rotation of outside surface 28 of continuous belt 26 also propels the separated corn ears toward conveyer 15 of corn harvesting head 12. In a preferred embodiment, as illustrated in FIG. 3, conveyer 15 is comprised of an auger 59 that includes an auger shaft 60. Auger shaft 60 runs the width of corn harvesting head 12 and is rotatably supported by bearings (not shown). Auger 59 also includes a plurality of winding auger blades 62 that are attached along the length of auger shaft 60 and an auger trough 64 which spans the width of corn harvesting head 12. From each end of auger shaft 60, auger blades 62 rotate to propel the separated corn ears, received in auger trough 64, toward the midline of auger trough 64 and ultimately onto a conveying device (e.g. receiving conveyor belt or chain and slat conveyor) 66. Receiving conveyer belt 66 then feeds the separated corn ears into combine 10.

To improve corn harvesting efficiency, both roller frame 16 and stationary surface frame 32 further support a plurality of stripper plates 48, as illustrated in FIG. 6. Stripper plates 48 are mounted along the length of roller frame 16 and of stationary surface frame 32 of row unit 14. Stripper plates 48 have edges 50 which freely overextend the medial margins of roller frame 16 and of stationary surface frame 32. Furthermore, edges 50 of stripper plates 48 preferably point downward in the direction facing the surface of the area of soil.

Stripper plates 48 are preferably configured to lay in a plane that is generally perpendicular to the first and second planes of row units 14. Moreover, the plane containing stripper plates 48 is generally located in the space between continuous belt 26 of an individual row unit 14 and the surface of the area of soil of the cornfield. Stripper plates 48 maximize yield during harvesting by snapping residual connections between corns ears and their respective stalks.

It will be understood that the foregoing description is of a preferred embodiment of this invention and that the invention is not limited to the specific forms shown. Other embodiments of the corn harvesting head will be apparent to those skilled in the art from consideration of the specification disclosed herein. For example, the side of belt 26 adjacent to surface 30 may be supported between rollers 22 and 24 with additional free-spinning rollers and/or slide rails. These support arrangements may provide more uniform contact forces between the surface of belt 26, surface 30, and the ears of corn. It is intended that the specification be considered exemplary only, with the true scope and spirit of the invention being indicated by the following claims.

What is claimed is:

1. A harvesting device for removing a plant portion supported by a respective plant stalk, the device comprising:
   a frame;
   a stationary surface supported by the frame; and
   a continuous belt including an outside surface for engaging the plant portions, the continuous belt being movably supported by two rollers to compress the plant portion between the stationary and outside surfaces, wherein movement of the belt rotates the plant portion relative to the stalk to remove the plant portion from the stalk.

2. The device of claim 1, wherein the stationary surface is resiliently supported by the frame such that the stationary surface is biased toward the outside surface with a predetermined amount of force sufficient to cause the belt to engage and to rotate the plant portion without subjecting the plant portion to substantial damage.

3. The device of claim 1, wherein the stationary surface is generally flat and lays within a first plane, the two rollers support the belt such that a portion of the outside surface is generally flat and lays within a second plane, and the first and second planes are substantially parallel.

4. The device of claim 3, wherein the stalk grows upwardly from a surface of an area of soil, and the harvesting device further comprises a vehicle for supporting the frame relative to the surface of soil such that the first and second planes are generally perpendicular to the surface of soil.

5. The device of claim 4, wherein the stationary surface is resiliently supported by the frame such that the stationary surface is biased toward the outside surface with a predetermined amount of force sufficient to cause the belt to engage and to rotate the plant portion without subjecting the plant portion to substantial damage.

6. The device of claim 5, further comprising stripper plates supported by the frame in a plane generally perpendicular with the first and second planes, the plane being located between the belt and the surface of the area of soil.

7. The device of claim 6, further comprising a conveyer supported by the frame adjacent to the belt to receive plant portions removed from stalks.

8. A combine for removing ears of corn supported by corn stalks from the respective corn stalks, the combine comprising:
   a vehicle supported by and moveable over the soil; and a header attached to the vehicle to engage the corn stalks which support the ears of corn, the header including first and second opposing surfaces configured to simultaneously engage opposite sides of each ear, wherein at least one of the first and second surfaces is moveable such that the first surface moves relative to the second surface to rotate the ears relative to their respective stalks to remove the ears from the stalks.

9. The combine of claim 8, wherein the header further comprises:

a frame attached to the vehicle; and a stationary surface supported by the frame; wherein the moveable surface is a surface of a continuous belt movably supported by two rollers to compress the ear between the stationary and moveable surfaces, and movement of the belt rotates the ears relative to their respective stalks to remove the ears therefrom.

10. The combine of claim 9, wherein the stationary surface is resiliently supported by the frame such that the stationary surface is biased toward the moveable surface with a predetermined amount of force sufficient to cause the belt to engage and to rotate the ears without subjecting the ears to substantial damage.

11. The combine of claim 9, wherein the stationary surface is generally flat and lays within a first plane, the two rollers support the belt such that a portion of the moveable surface is generally flat and lays within a second plane, and the first and second planes are substantially parallel.

12. The combine of claim 11, wherein the stalks grow upwardly from a surface of an area of soil, and the vehicle for supporting the frame relative to the surface of soil such that the first and second planes are generally perpendicular to the surface of soil.

13. The combine of claim 12, wherein the stationary surface is resiliently supported by the frame such that the stationary surface is biased toward the moveable surface with a predetermined amount of force sufficient to cause the moveable surface to engage and to rotate the ears without subjecting the ears to substantial damage.

14. The combine of claim 13, wherein the header further comprises stripper plates supported by the frame in a plane generally perpendicular with the first and second planes, the plane being located between the belt and the surface of the area of soil.

15. The combine of claim 14, further comprising a conveyer supported by the frame adjacent to the belt to receive ears removed from stalks.

16. A combine for removing ears of corn supported by corn stalks from the respective corn stalks, the combine comprising:

a vehicle supported by and moveable over the soil; and means, attached to the vehicle, for engaging and for rotating the ears relative to their respective stalks to remove the ears from the stalks, the means including first and second opposing surfaces configured to simultaneously engage opposite sides of each ear, wherein at least one of the first and second surfaces is moveable such that the first surface moves relative to the second surface.

17. The combine of claim 16, wherein the means for engaging further comprises:

a frame attached to the vehicle;

a stationary surface supported by the frame; and a continuous belt including an outside surface, wherein the belt is supported by two rollers to compress the ear between the stationary and outside surfaces, and movement of the belt rotates the ears relative to their respective stalks to remove the ears therefrom.

18. The combine of claim 17, wherein the stationary surface is resiliently supported by the frame such that the stationary surface is biased toward the outside surface with a predetermined amount of force sufficient to cause the belt to engage and to rotate the ears without subjecting the ears to substantial damage.

19. The combine of claim 17, wherein the stationary surface is generally flat and lays within a first plane, the two rollers support the belt such that a portion of the outside surface lays within a second plane, and the first and second planes are substantially parallel.

20. The combine of claim 19, wherein the stalks grow upwardly from a surface of an area of soil, and the vehicle for supporting the frame relative to the surface of soil such that the first and second planes are generally perpendicular to the surface of soil.

* * * * *